April 26, 1927.  D. VON MIHÁLY  1,625,967
PHOTOTELEGRAPHIC APPARATUS
Filed Dec. 29, 1923
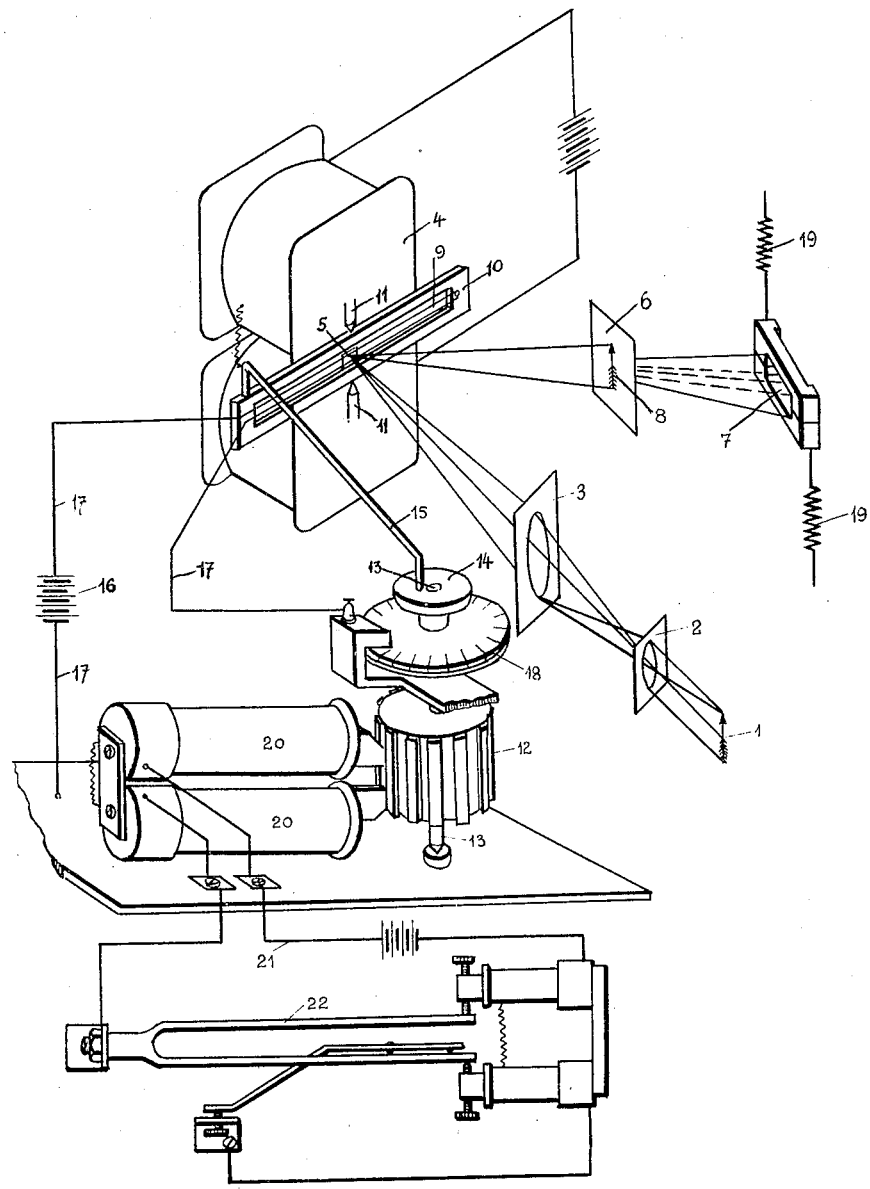
Inventor
Dénes von Mihály
By Sturtevant & Mason
Attorney Patented Apr. 26, 1927.

1,625,967

UNITED STATES PATENT OFFICE.

DÉNES von MIHALY, OF BUDAPEST, HUNGARY.

PHOTOTELEGRAPHIC APPARATUS.

Application filed December 29, 1923, Serial No. 683,429, and in Hungary January 2, 1923.

This invention relates to phototelegraphic apparatus and more particularly to an arrangement for dividing and assembling the picture into or from its composite parts.

The transmission of pictures from a distance, known as phototelegraphy, is based as is well known, on the feature that the picture to be transmitted is divided at the transmitting station into as many small parts as possible, called picture elements, and these are projected in rapid succession on to a selenium cell or the like, which produces, according to the luminous intensity of the separate picture elements, in an electric circuit leading to the receiving station, varying current impulses. These current impulses influence at the receiving station (place of reproduction) the luminous intensity of a point of light projected on to a screen, the said point of light being moved on the screen in such a way that it forms picture elements on the screen corresponding to the picture elements formed at the transmitting station and which together compose the entire picture.

An arrangement for dividing the picture into picture elements must therefore be provided at the transmitting station and an arrangement for assembling the picture elements at the receiving station. These two devices are identical with one another and it is necessary for the correct working that they shall be moved quite uniformly, that is to say synchronously.

Two oscillating mirrors have hitherto been used for dividing and also for composing the pictures, the axes of oscillation of which mirrors form with one another an angle, preferably a right angle. One of these mirrors is moved slowly and the other more rapidly. At the transmitting station the picture is divided by these mirrors in known manner into picture elements and the separate picture elements projected on to the selenium cell, the picture elements being smaller and closer the more rapidly one mirror is moved relatively to the other.

The present applicant has already proposed a means for utilizing as the more rapidly moved mirror, the mirror of a mirror oscillograph, which has the advantage that this mirror can make very many oscillations.

In the arrangement which forms the object of the present invention only one mirror is employed for dividing and also for the composition of the picture, namely the mirror of an oscillograph, but this is used in such a way that this mirror makes, simultaneously, oscillations about two axes which are at right angles to one another. For this purpose to loop holder of the oscillograph is mounted so as to rock about an axis which is at right angles to the axis of the loop and is connected with an operating mechanism which oscillates to and fro the loop holder together with the loop and the small mirror fixed thereon.

An example of construction of phototelegraphic apparatus at the transmitting station, is diagrammatically illustrated in the accompanying drawing.

The image of the object 1 is condensed through the series of lenses 2 and 3 on to a very small surface and thrown on a mirror 5 of an oscillograph 4 which reflects the picture through a diaphragm 6 on to a selenium cell 7. The diaphgram 6 has only a very small aperture 8 so that always through this only a very small part of the picture passes to the selenium cell 7. The frame 10 which holds the loop 9 of the oscillograph 4 (that is to say the loop carrier) is adapted to oscillate on pins 11 arranged in a line at right angles to the longitudinal axis of the frame.

In the arrangement illustrated a phonic (La Cour) wheel 12 of known type is employed for oscillating the frame 10, having its crank 14 mounted on the shaft 13 and flexibly connected with the frame 10 by means of a rod 15. The phonic wheel 12 rotates as is well known quite uniformly and its number of revolutions is constant, as the circuit 21 of the magnet 20 rotating the wheel is intermittently operated by the tuning fork 22.

A current of high and invariable frequency is passed through the loop 9 of the oscillograph, which current swings the mirror 5 about an axis parallel with the longitudinal axis of the loop 9 and thus at right angles to the pins 11.

In consequence of these double oscillations of the small mirror 5 a different point of the picture thrown by the mirror on to the diaphragm 6 is always superposed over the aperture 8 and therefore the separate points of the picture successively lie over the aperture 8 and through this aperture pass to the selenium cell 7.

The current of high frequency conveyed through the loop of the oscillograph, is obtained, in the form of construction illustrated, from a battery 16 in the circuit 17 of which a disc 18 formed like a commutator and mounted on the shaft 13 of the phonic wheel is inserted. The disc 18 makes and breaks the circuit 17 perfectly uniformly in consequence of its uniform rotation. The number of the current changes and impulses is determined by the number of revolutions of the shaft 13 and the number of current interrupters provided on the disc 18.

The receiving station (reproducing station) substantially coincides with the transmitting station and only differs from the latter in that in place of the selenium cell, a device of known type which throws a point of light on the oscillograph mirror 5 is provided. The luminous intensity of this point of light is regulated in known manner by the circuit 19 of the selenium cell 7 by means of a so-called light relay.

The oscillograph mirror oscillating about two axes throws the point of light on to a screen so that this point of light according to the movement of the mirror, always encounters a different part of the screen. If the movement of the oscillograph mirror 5 at the transmitting station is identical and synchronous with the movement of the oscillograph mirror of the receiving station the image of the object to be transmitted is thrown on the screen assuming that at the transmitting station the division of the picture takes place sufficiently rapidly.

If a similar phonic wheel arrangement is employed at the receiving station, as at the transmitting station, both oscillograph mirrors 5 evidently move uniformly. In order to make the movement uniform and correct it, if necessary, suitable synchronizing devices may also be used, which are assumed to be well known.

For oscillating the oscillograph loop holder, it is not necessary to employ phonic wheels only as also other operating devices may be employed. The alternating or intermittent current for the loop of the oscillograph may also be generated in any suitable way. It is only essential that at the transmitting and receiving stations the oscillograph mirrors must be moved in perfect uniformity which is obtained very simply by employing the phonic wheels mentioned.

By this invention phototelegraphic apparatus is very much simplified and is easily controllable since it is adapted to be regulated and exact in action.

I declare that what I claim is:—

1. In an apparatus for dividing or assembling pictures into or from their composite elements more particularly adapted for phototelegraphy, the combination of an oscillograph, a frame mounted in said oscillograph to pivot about an axis, a loop mounted in said frame to pivot about an axis arranged at an angle to said first axis, a mirror mounted on said loop, means to oscillate said loop, means to oscillate said frame simultaneously about said axis arranged at an angle to said other axis.

2. In an apparatus for dividing or assembling pictures into or from their composite elements more particularly adapted for phototelegraphy, the combination of an oscillograph, a frame mounted in said oscillograph to pivot about an axis, a loop mounted in said frame to pivot about its longitudinal axis arranged at right angles to the axis of said frame, a mirror fixed to said loop, means to oscillate said loop about said longitudinal axis and means to oscillate said frame simultaneously about said axis at right angles to said longitudinal axis.

3. In an apparatus for dividing or assembling pictures into or from their composite elements more particularly adapted for phototelegraphy, the combination of an oscillograph, a frame mounted in said oscillograph to pivot about an axis, a loop mounted in said frame to pivot about its longitudinal axis, a mirror mounted rigidly on said loop, a source of direct current passing current through said loop, means to interrupt said current periodically in order to oscillate said loop about said longitudinal axis and means to oscillate said frame simultaneously about an axis at right angles to said longitudinal axis.

4. In apparatus for dividing or assembling pictures into or from their composite elements, more particularly adapted for photo-telegraphy, the combination of an oscillograph, a loop mounted on said oscillograph for oscillation about a longitudinal axis, a mirror mounted rigidly on said loop, means to oscillate said loop about said longitudinal axis, a frame carrying said loop, pivotal means to support said frame and allowing pivotal movement about an axis at right angles to said longitudinal axis, a phonic wheel driven by interrupted direct current and carrying a crank disc, and flexible connecting means between said frame and said crank disc.

5. In apparatus for dividing or assembling pictures into or from their composite elements, more particularly adapted for photo-telegraphy, the combination of an oscillograph, a loop arranged in said oscillograph oscillatable about a longitudinal axis, a mirror mounted rigidly on said loop, a source of direct current passing current through said loop, a frame carrying said loop, pivotal means supporting said frame and allowing pivotal movement about an axis at right angles to said longitudinal axis, a phonic wheel adapted to cause the oscillation of said frame about its pivotal axis, and a commutator driven by said phonic wheel and adapted to interrupt said direct current with a high frequency of interruption in order to oscillate said loop about its longitudinal axis.

In witness whereof, I have hereunto signed my name.

DÉNES von MIHÁLY.